(12) United States Patent
Basile et al.

(10) Patent No.: US 7,706,661 B2
(45) Date of Patent: Apr. 27, 2010

(54) COPY PROTECTION OF OPTICAL DISCS USING REDUNDANT CONTROL DATA

(75) Inventors: Carmen Laura Basile, Maidenhead (GB); Lee Avery, Fremont, CA (US); Glenn Siebert, Morgan Hill, CA (US)

(73) Assignee: Macrovision Corporation, Santa Clara, CA (US)

( * ) Notice: Subject to any disclaimer, the term of this patent is extended or adjusted under 35 U.S.C. 154(b) by 1101 days.

(21) Appl. No.: 10/848,879

(22) Filed: May 19, 2004

(65) Prior Publication Data

US 2005/0259546 A1  Nov. 24, 2005

(51) Int. Cl.
*H04N 7/26* (2006.01)
*H04N 5/91* (2006.01)
(52) U.S. Cl. .................................. 386/46; 386/125
(58) Field of Classification Search .............. 386/46
See application file for complete search history.

(56) References Cited

U.S. PATENT DOCUMENTS

| | | | |
|---|---|---|---|
| 6,580,872 B1 | 6/2003 | Kikuchi et al. | |
| 6,778,265 B1 * | 8/2004 | Lin et al. ................. | 356/125 |
| 7,046,607 B2 * | 5/2006 | Yamada ................ | 369/53.21 |
| 7,099,560 B2 * | 8/2006 | Yoshimura et al. ....... | 386/94 |
| 2002/0144123 A1 * | 10/2002 | Newman ................. | 713/176 |
| 2002/0159591 A1 * | 10/2002 | Heylen et al. ............. | 380/201 |
| 2004/0033054 A1 * | 2/2004 | Haino et al. .............. | 386/95 |
| 2004/0076097 A1 * | 4/2004 | Sawabe et al. ......... | 369/53.22 |
| 2004/0264336 A1 * | 12/2004 | Saito et al. ............. | 369/59.24 |

FOREIGN PATENT DOCUMENTS

| | | |
|---|---|---|
| EP | 1239472 A1 | 9/2002 |
| EP | 1536420 A2 | 10/2004 |
| GB | 2383185 A | 6/2004 |
| GB | 2402541 A | 12/2004 |
| JP | 08-212681 | 8/1996 |
| JP | 10-106145 | 4/1998 |
| JP | 10-326462 | 12/1998 |
| JP | 11-003568 | 1/1999 |
| JP | 2000-011536 | 1/2000 |
| JP | 2000-048478 | 2/2000 |

(Continued)

OTHER PUBLICATIONS

European Search Report for EP 05 25 2732 dated Nov. 18, 2006, 1 page.

(Continued)

*Primary Examiner*—Thai Tran
*Assistant Examiner*—Oluwaseun A Adegeye
(74) *Attorney, Agent, or Firm*—Norman R. Klivans (57) ABSTRACT

Subservive data has been incorporated in the content of an optical disc, such as a DVD, to prevent copying of the disc. To defeat such copy protection, devices to copy optical discs are now being controlled to only copy data referred to by selected program paths. Accordingly, it is proposed to provide copy protection for optical discs by introducing errors into redundant control data to frustrate access to content on the disc. For example, the errors may be inconsistencies in a Video Manage Information Table (VMGI) or in a Video Title Set Information Table (VTSI).

46 Claims, 11 Drawing Sheets

FOREIGN PATENT DOCUMENTS

| | | |
|---|---|---|
| JP | 2001-086458 | 3/2001 |
| JP | 2001-351319 | 12/2001 |
| JP | 2002-109870 | 4/2002 |
| JP | 2002-157839 | 5/2002 |
| JP | 2002-190183 | 7/2002 |
| JP | 2002-230783 | 8/2002 |
| JP | 2003-000691 | 1/2003 |
| JP | 2003-006981 | 1/2003 |
| JP | 2003-187459 | 7/2003 |
| JP | 2003-243993 | 8/2003 |
| JP | 2004-023607 | 1/2004 |
| JP | 2004-102473 | 4/2004 |
| JP | 2004-120473 | 4/2004 |
| KR | 2001-53603 | 6/2001 |
| WO | WO-98/01852 A1 | 1/1998 |
| WO | WO 00/74053 A1 | 12/2000 |
| WO | WO 01/61695 | 8/2001 |
| WO | WO 01/61696 | 8/2001 |
| WO | WO 02/11136 | 2/2002 |

OTHER PUBLICATIONS

GB Search Report for GB0509015.4 dated Jul. 21, 2005, 1 page.

* cited by examiner

COPY PROTECTION OF OPTICAL DISCS USING REDUNDANT CONTROL DATA

The present invention relates to a method of copy protecting an optical disc carrying content and control data and to a copy protected optical disc. The invention also extends to an image file for use in the mastering of a copy protected optical disc, and to a method of forming an image file for use in producing a copy protected optical disc.

There are many techniques for copy protecting optical discs. For example, WO 01/61695 and WO 01/61696 describe methods which remove, corrupt or otherwise render inaccurate control data associated with the information on an optical disc. The control data is chosen such that the copy protection method, whilst preventing the production of usable copy discs, does not prevent or degrade the playing of legitimate optical discs on all players having the functionality to play such optical discs.

It has been found that there are many ways to deliberately subvert the information and/or the control data carried on an optical disc such that the disc cannot be reliably read or copied. For example, in our copending U.S. provisional application No. 60/545,979 filed on 19 Feb. 2004 we describe a method in which subversive data is 'hidden' in the content on the disc, for example, in video object files, to stop the copying of data from the optical disc and/or to prevent usable copies of the data from being made. This earlier method is effective where, as is common, the device used to make the copy disc is controlled to copy the data on the disc on a sector by sector basis.

However, because measures to protect sector by sector and/or file by file copying have been proposed, devices to be used to copy optical discs are now being controlled to parse navigation data, for example, and then to only copy data referred to by selected program paths.

The present invention seeks to prevent copying by devices which parse navigation data.

According to a first aspect of the present invention there is provided a method of copy protecting an optical disc carrying content and control data, wherein the content is arranged in one or more content files and the control data is arranged to control access to the content files, the method comprising the step of:

incorporating errors into redundant control data which is not utilised during play of the information on the disc, wherein the errors are arranged to frustrate access to the content files by way of the control data.

With embodiments of the invention, redundant control data, which will not be utilised during the play of content on the disc, has errors incorporated therein which frustrate access to the content files by way of the control data. Therefore, a device arranged to copy the disc by parsing navigational information so as to access the data might fail. However, as the errors are incorporated into redundant control data, normal play of the disc will not be compromised.

Preferably, the control data defines program paths providing access to the content files, and the errors are arranged to frustrate navigation of at least one program path.

In a preferred embodiment, the content files are video object files composed of video objects (VOBs) which are divided into cells, and wherein the cells can be accessed by respective pointers in a program chain.

Currently, the devices which copy by parsing navigational data generally seek to parse the navigational data of a program chain.

The errors which are to be incorporated into the redundant control data may be any errors which will cause the copying operation undertaken by a device parsing navigational data to fail. For example, the errors may incorrectly identify the number of programs, and/or the number of pointers, in a program chain defined by the control data.

Particularly where the optical disc is in a DVD format, the errors may be inconsistencies in a Video Manager Information Table (VMGI) or in a Video Title Set Information Table (VTSI). In this latter case, inconsistencies may be introduced into a cell position information table (C_POSIT) in the Video Title Set Information Table (VTSI). Additionally and/or alternatively, the inconsistencies may be introduced into program chain general information (PGC_GI) in a program chain information table (VTS_PGCI) in the Video Title Set Information Table (VTSI).

In another embodiment, the addressing of cells in the video object file may be altered such that the addressing of the cells and the information in a cell position information table are inconsistent.

It may be that redundant control data is already present on an optical disc, or in the content and control data to be applied to an optical disc. In such a circumstance, errors may be incorporated into the redundant control data which is already present.

Alternatively, redundant control data may be specifically provided for application to an optical disc, and errors may then be incorporated into that added redundant control data before its application to the optical disc.

As set out above, the present invention seeks particularly to provide copy protection which is effective against devices which copy by parsing navigational data. However, it may additionally be required to protect against devices which copy on a sector by sector and/or file by file basis. To meet this additional requirement, embodiments of the present invention may additionally comprise providing at least one region within the content files containing unreadable or other subversive data.

For example, data patterns which have been chosen to cause DSV problems may be included in a region of the content files to provide the unreadable data.

Examples of data patterns causing DSV problems, and of their uses are described, for example, in our earlier application No. WO 02/11136. Any of the data patterns described in that earlier case may be used as unreadable or subversive data in embodiments of the present invention.

The present invention also extends to a copy protected optical disc carrying content and control data, wherein the content is arranged in one or more content files and the control data is arranged to control access to the content files, wherein redundant control data, which is not utilised during play of the content on the disc, has errors incorporated therein, the errors having been arranged to frustrate access to the content files by way of the control data.

Preferably, the control data defines program paths providing access to the content files, and the errors are arranged to frustrate navigation of at least one program path.

In a preferred embodiment, the content files are video object files composed of video objects (VOBs) which are divided into cells, and wherein the cells can be accessed by respective pointers in a program chain.

The errors incorporated in the redundant control data may incorrectly identify the number of programs, and/or the number of pointers, in a program chain defined by the control data. The other inconsistencies identified above may also be alternatively or additionally used in a copy protected optical disc as defined.

In an embodiment, the errors will have been incorporated into control data ordinarily present on the optical disc but considered redundant as that data is not utilised during play of the content on the disc.

In an alternative embodiment, the errors have been incorporated in control data which has been applied to the disc to form redundant control data which is not utilised during play of the content on the disc.

As defined above, unreadable or other subversive data may additionally be included on optical discs of the invention in at least one region provided within the content files.

According to a further aspect of the present invention there is provided an image file for use in the mastering of a copy protected optical disc, the image file including content and control data, the content being arranged in one or more content files, and the control data being arranged to control access to the content files, wherein redundant control data, which will not be utilised by play of the mastered disc, has errors incorporated therein, the errors being arranged to frustrate access to the content files by way of the control data on the mastered disc.

Image files are a well known stage in the formation of content and control data for application, by encoding, onto a copy protected optical disc.

Preferably, the control data defines program paths providing access to the content files, and the errors are arranged to frustrate navigation of at least one program path.

In a preferred embodiment, the content files are video object files composed of video objects (VOBs) which are divided into cells, and wherein the cells can be accessed by respective pointers in a program chain.

The errors incorporated in the redundant control data of the image file may be in accordance with one or more of the examples given above.

In one embodiment, the errors have been incorporated into control data ordinarily present within the image file but considered redundant as that data is not utilised during play of the mastered disc.

Alternatively, the errors have been incorporated in control data which has been additionally provided within the image file as redundant control data which is not utilised during play of the mastered disc.

As set out above, unreadable or other subversive data may also be incorporated into the image file in at least one region within the content files.

The present invention also extends to a method of forming an image file for use in producing a copy protected optical disc, the method comprising:

forming an image file including content and control data, the content being arranged in one or more content files, and the control data being arranged to control access to the content files;

the method further comprising:

incorporating errors into redundant control data, which control data will not be utilised by play of the mastered disc, the errors being arranged to frustrate access to the content files by way of the control data on the mastered disc; and storing the image file.

In an embodiment, the image file is stored on a recordable disc or on magnetic tape.

Preferably, the control data defines program paths providing access to the content files, and the incorporated errors are arranged to prevent navigation information parsing devices from reading the correct navigation data for legitimate program paths.

In a preferred embodiment, the content files are video object files composed of video objects (VOBs) which are divided into cells, and the cells can be accessed by respective pointers in a program chain.

As previously, the errors may be incorporated into redundant control data already present within the content and control data forming the image file. Alternatively, redundant control data may be added to the content and control data for forming the image file, the added redundant control data incorporating errors.

According to a further aspect of the present invention there is provided a recordable media carrying an image file as defined above or carrying an image file formed by a method as defined above.

Embodiments of the present invention will hereinafter be described, by way of example, with reference to the accompanying drawings, in which.

The present invention is applicable to optical discs in general but is described herein with reference to DVD formats.

Figure 1:
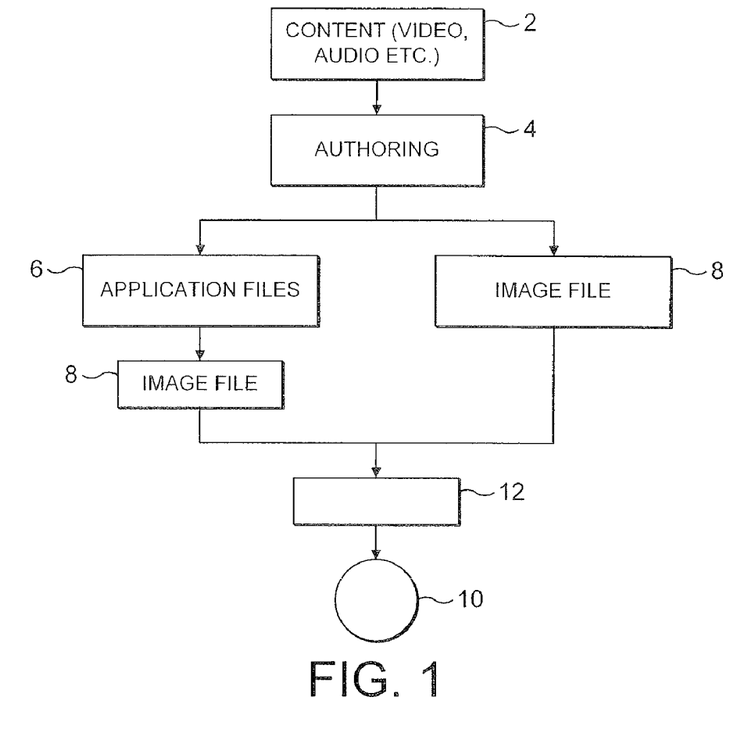
FIG. 1 illustrates schematically the production of a DVD.

FIG. 1 illustrates schematically the production of a DVD 10 by the application of content, such as video, audio, text and graphics, thereto. In this respect, the content 2 is combined with appropriate control data to provide authored material 4. This material 4 may then be arranged in appropriate application files 6 which will enable the DVD to be played by a proprietary DVD player. The application files 6 may then be provided as an image file 8 representing the data to be mastered. The image file 8 is rendered in disc description protocol file format and may be recorded on an appropriate storage device such as a mastering tape or other recordable media 12. The image file on the recordable media 12 can then be encoded onto a glass master 10 by way of an encoder (not shown).

FIG. 1 shows schematically an alternative route in which the authored material 4 is created directly into an image file 8 without the imposition of an intermediate step.

As is well known, the user data in the image file 8 is the content which is to be written to and accessed from the disc and may comprise text, graphics, video, audio, programs, control data, and/or any other sort of data. This data is subject to formatting, scrambling, and error correction before it is subjected to EFM Plus encoding whereby a sequence of bits, that is, a series of 0's and 1's, is produced. It is the sequence of bits which is applied to the disc 10 by an appropriate mastering means to form pits and lands. In this respect, in a DVD writer the mastering means will generally be a laser beam recorder. Laser beam recorders are also used in mastering houses, but alternative mastering techniques are available and may be utilised.

Figure 2:
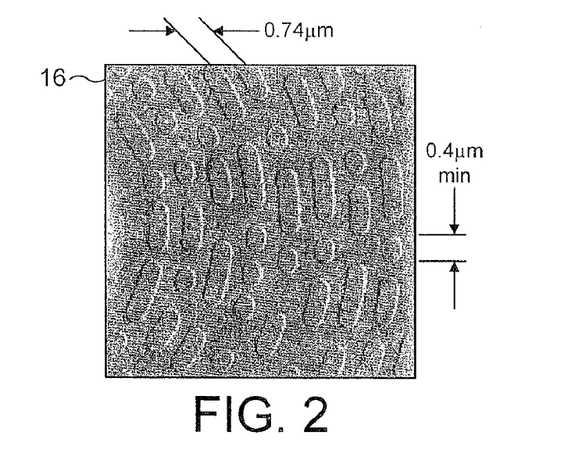
FIG. 2 shows an enlarged part of the surface of a DVD.

FIG. 2 shows an enlarged part of a DVD showing the pits 16 thereon. As is well known, these pits extend along a spiral track on the surface of the disc 10 and are separated by lands.

Figure 3:
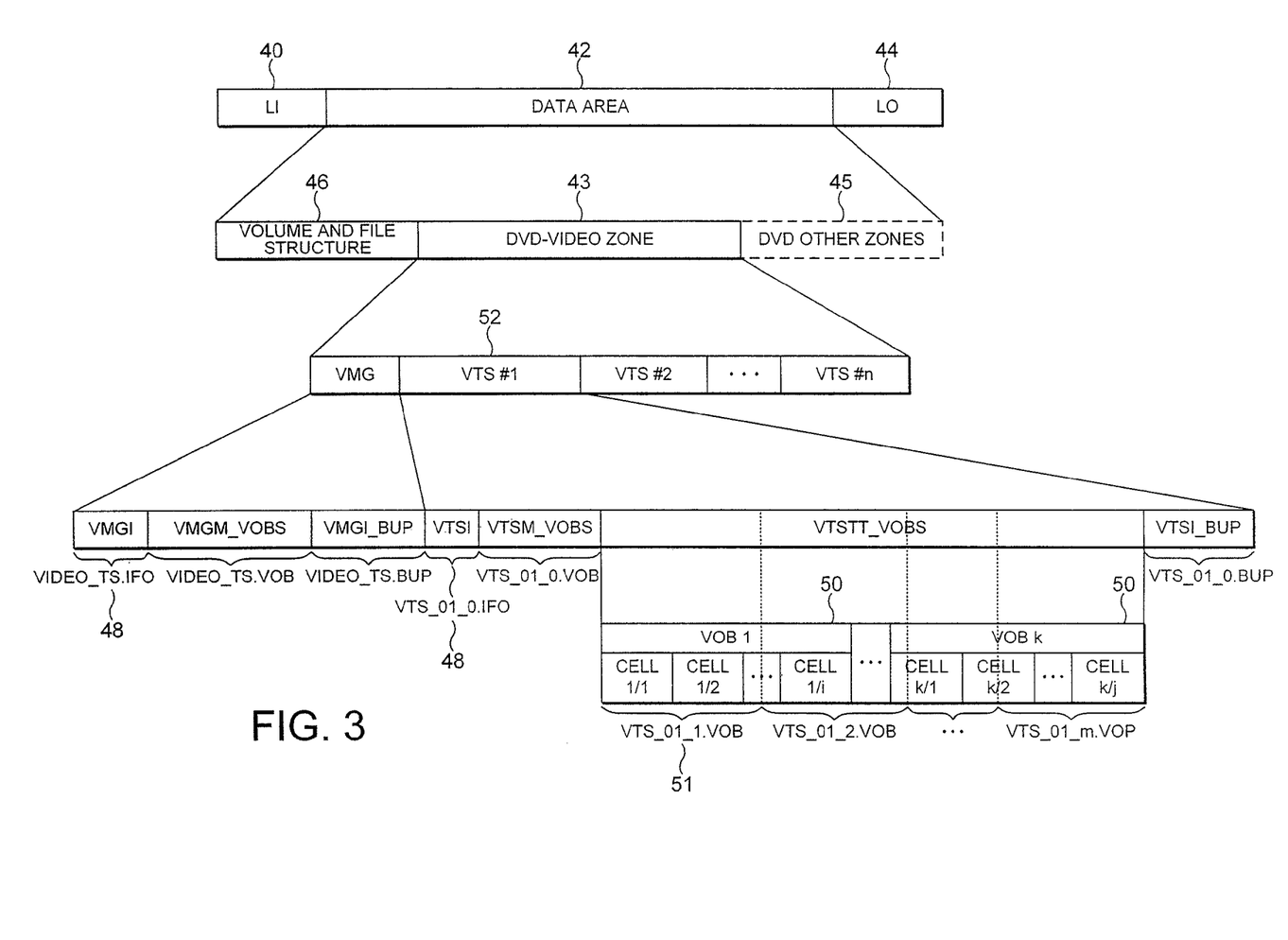
FIG. 3 illustrates the structure of data on a DVD.

The data on the DVD is arranged along the spiral track. As shown in FIG. 3, this data is structured to have a Lead-in 40, a data area 42 and a Lead-out 44.

The structure of the data on the DVD is the subject of standards, and is well known to those skilled in the art. Accordingly, only parts of the data structure of a DVD_Video which are relevant to the present invention are described and illustrated herein. As is further indicated in FIG. 3, the data area 42 includes a volume descriptor 46 which identifies the structure and contents of the data in the data area 42. This volume descriptor 46 is followed by a DVD_Video Zone 43 and possibly other DVD zones 45. The DVD_Video Zone 43 comprises a Video Manager (VMG) and a number of Video Title Sets (VTSs). Information files (IFO) 48 are provided in the Video Manager (VMG) and each of the Video Title Sets (VTSs) and provide the syntax by which navigation to video objects (VOB) 50 is achieved. As is well known, each video object 50 contains an MPEG program stream which is made up of video, audio, and other content streams. The other content may comprise text and graphics, for example. A video object 50 also includes control data for controlling the presentation of its content together with control data enabling the data within the video object to be searched. The video objects 50 compose a set of video objects for the titles (VTST-T_VOBS) in Video Title Set VTS#1. The VTSTT_VOBS is divided into video object files 51 whose size does not exceed 1 GB.

Figure 4:
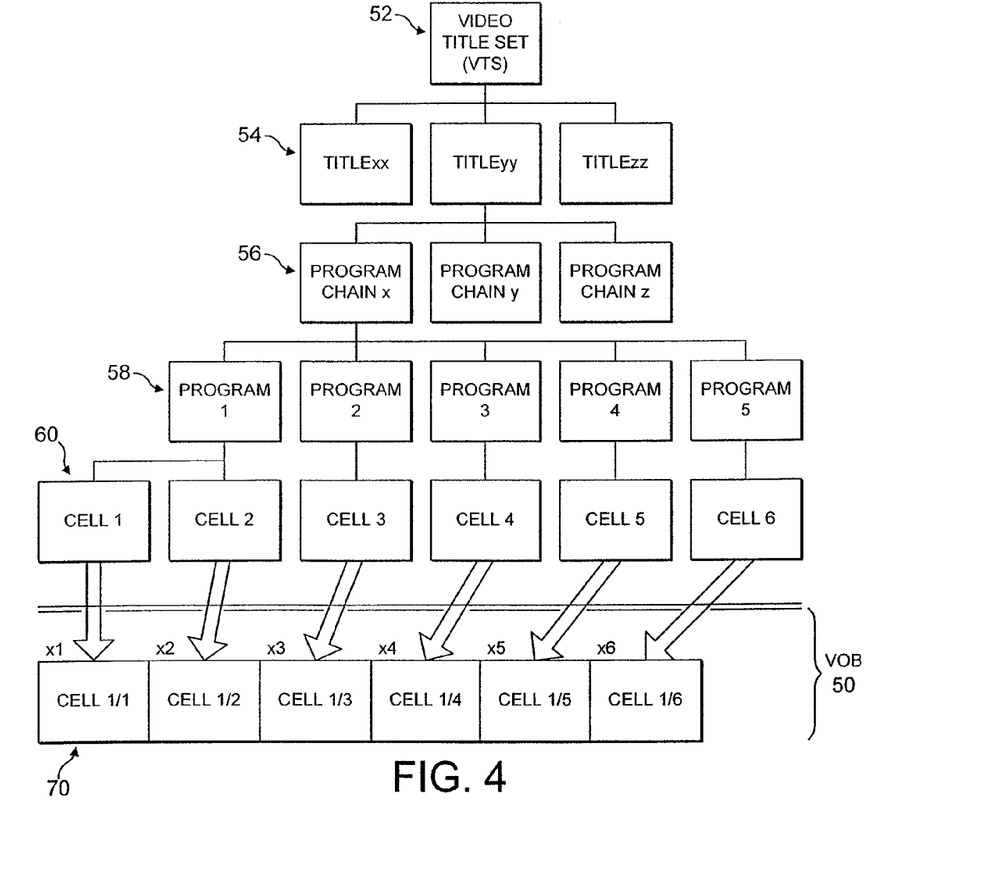
FIG. 4 shows the structure of a video title set (VTS) in a conventional DVD.

FIG. 4 shows the structure of a video title set (VTS) and illustrates how, in a conventional DVD, a movie, for example, stored in a single video object 50, can be accessed and navigated and thereby played.

In FIG. 4, not all of the connections and pointers between files in the DVD_Video structure have been illustrated. Instead, FIG. 4 illustrates how a single video object 50 is addressed.

In the structure illustrated in FIG. 4 there is a video title set (VTS) 52 containing a collection of titles 54. Each title 54 includes one or more program chains 56. In FIG. 4, the title 54 "TITLE yy" addresses the chosen video object 50 and does so by way of program chain x. Each program chain 56 typically includes a number of individual programs as 58 which are arranged to be played in sequence. Each of the programs 58 has a pointer as 60. Typically, there is a single pointer 60 from each program 58 to a single corresponding video object 50, and each pointer 60 addresses a particular part of the corresponding video object 50.

As is illustrated in FIG. 4, each video object 50 is divided into a number of individual cells 70. Typically, each of the programs 58 points, by way of its pointer 60, to an individual one of the cells 70 of the video object 50. However, it is possible, as also indicated in FIG. 4 for a single program 58, as program 1, to have more pointers 60, for example, two pointers which address two cells 70, as cells 1/1 and 1/2. The arrangement is generally that, as the programs 58 are played in sequence by way of the relevant program chain 56, the cells 70 within the video object 50 are similarly accessed in order.

Figure 5:
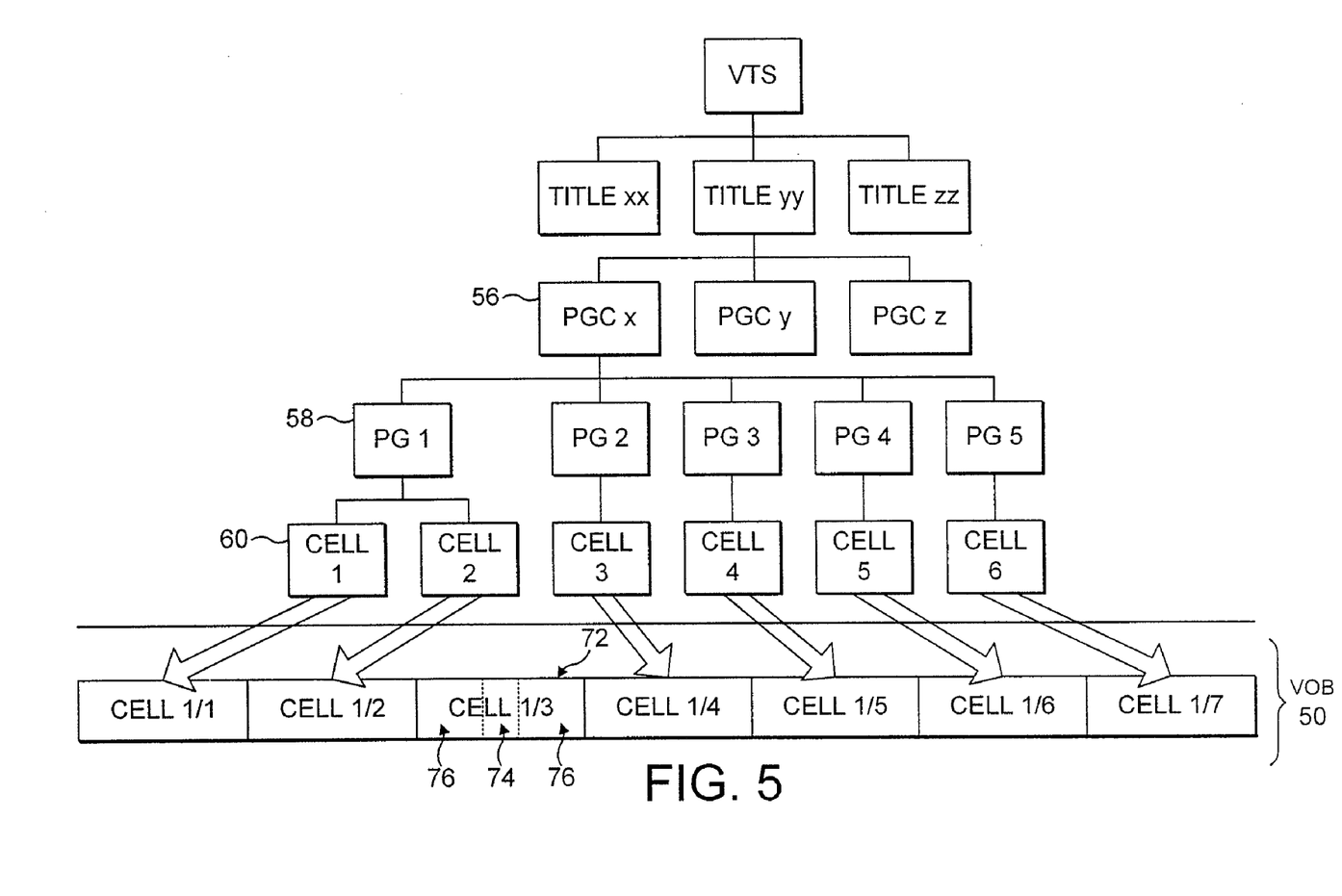
FIG. 5 shows a view similar to that of FIG. 4 but illustrating copy protection techniques using subversive data.

FIG. 5 shows an arrangement similar to that of FIG. 4 except that the DVD illustrated in FIG. 5 has been copy protected as described, for example, in U.S. application No. 60/545,979 filed on 19 Feb. 2004. It will be seen, by a comparison of FIGS. 4 and 5, that an additional cell 72 has been interposed between two cells 70 of the video object 50. As is also shown in FIG. 5, subversive data indicated at 74 has been incorporated within the additional cell 72. There is a buffer area 76 on either side of the subversive data 74 within the additional cell 72.

The subversive data 74 in the additional cell 72 of the video object 50 may be any data which will stop a drive reading or playing the additional cell on an optical disc, and/or will stop the copying of data from the optical disc and/or will prevent usable copies of data on the disc being made. Examples of subversive data which meet these requirements include data with incorrect error correcting codes, and information which has been deliberately altered. The data might be, or include, data patterns chosen to cause DSV problems, for example, chosen to ensure that the DSV has a significant absolute value and/or that the DSV has a rapid rate of change. A description of DSV data patterns and the problems they cause is given, for example, in WO 02/11136. It is additionally and/or alternatively possible to provide data which has mistimed waveform transitions.

Of course, when provided on an original disc, subversive data could cause problems for a device seeking to play or otherwise use the optical disc for legitimate purposes. Accordingly, and as shown in FIG. 5, steps are taken to ensure that during normal use of the optical disc 10, for example, during play by a device, the subversive data 74 is never accessed. In this respect, and as illustrated in FIG. 5, there are no pointers 60 in the main program chain 56 pointing to the additional cell 72. It will also be appreciated, from a consideration of FIG. 5, that if the program chain 56, for example, is executed, the device will not navigate to the additional cell 72. In this way, the subversive data can be provided on the disc without any risk that it will subvert normal playing of the disc.

When an attempt is made to read data from a copy protected disc as illustrated in FIG. 5, rather than playing the video and audio content on the disc, many commercially available devices arranged to copy DVDs seek to extract all of the data on the disc. Copying is generally undertaken on a sector by sector or on a file by file basis. For example, the device accesses each sector on the disc in turn to extract the data in that sector. Thus, during a copying operation, the device will access the additional cell 72. It is possible that the subversive data 74 in the additional cell 72 will cause the read operation of the disc to fail. Alternatively, the subversive data may result in the generation of error flags which will mean that any copy that the device is able to make will generally be unplayable.

Whilst the copy protected disc as illustrated in FIG. 5 is effective against many commercially available devices for copying DVDs, there are devices controlled to copy discs which can circumvent the copy protection. For example, there are devices now available which use navigation data, particularly in information files 48, to navigate to the data to be copied. Thus, the device determines which data on the disc is designated to be played, and only that data is copied. Such devices, therefore, are not stopped from copying the data on the disc by an arrangement as shown in FIG. 5.

The present invention has been developed specifically to copy protect discs against devices which are controlled to navigate to the data to be copied, or which otherwise parse the information files 48 to determine a copying strategy. Of course, embodiments of the present invention may be used in conjunction with copy protection techniques as illustrated, for example, in FIG. 5, whereby protection of the data on a disc against both types of copying technique can be achieved.

In embodiments of the present invention, errors are introduced into redundant control data, that is, control data which is not utilised during play of the data on a DVD. The errors are chosen such that a device arranged to copy the DVD by identifying navigable paths on the disc prior to copying the data content to which those paths lead will fail to read the disc. Alternatively, the errors may result in the generation of error flags which will mean that any copy that the device is able to make will generally be unplayable.

Figure 6A:
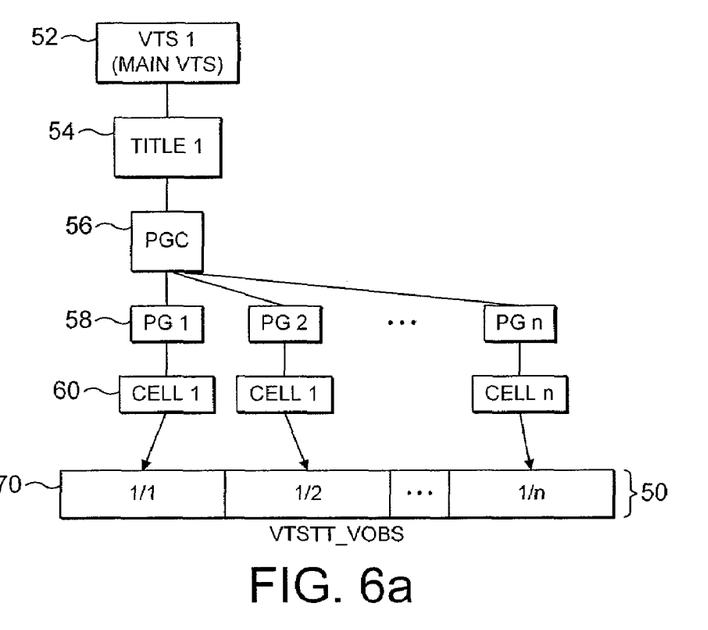
FIG. 6a shows a part of the structure of a DVD as shown in FIG. 4.
Figure 6B:
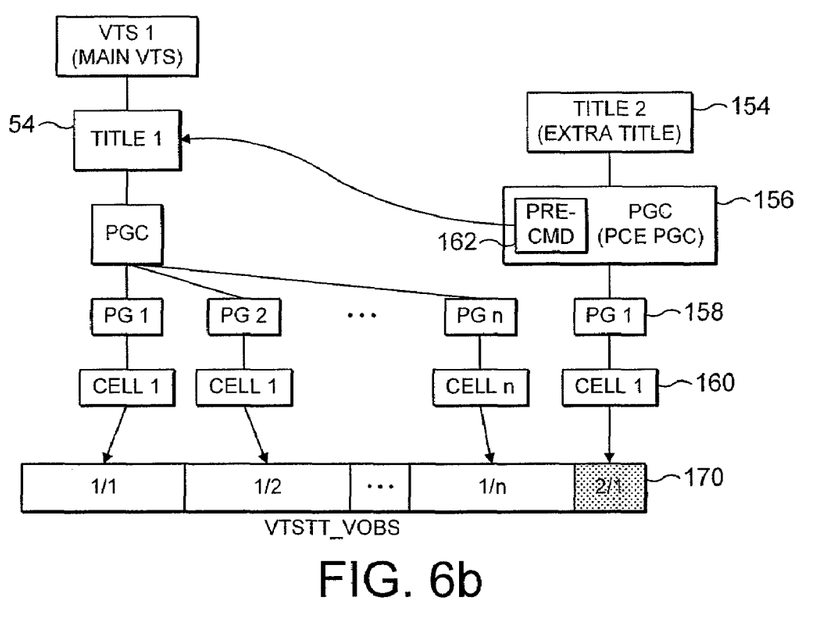
FIG. 6b shows a structure similar to that of FIG. 6a but illustrating the provision of redundant control information and redundant content in accordance with a method of the invention.

An embodiment of the present invention is illustrated in FIGS. 6a and 6b. In this respect, FIG. 6a shows part only of the structure of FIG. 4 and illustrates just a single program chain 56. The program chain 56 incorporates n programs 58 for addressing n cells 70, namely cells /1, 1/2 . . . 1/n, within the video object 50. FIG. 6b illustrates the modification of the structure shown in FIG. 6a to provide copy protection. As can be seen in FIG. 6b, extra content and control data has been added to form the modified structure. The added data comprises an additional title 154, an additional program chain 156, an additional program 158, and an additional pointer 160 which points to an additional video object containing an additional cell 170 within the VTSTT_VOBS 50. If required, the new cell 170 may also include subversive data for copy protection of the disc by the method illustrated in FIG. 5, for example.

It will be appreciated that the added title 154 addresses the added cell 170. However, the content of the additional video object cell 170 is not required during play of the DVD and the title 154 with its program chain 156 constitute redundant control data which will not be utilised by a DVD player playing the DVD. The title 154 and its program chain 156 may be accessed by a device seeking to copy the disc which is controlled to navigate to the addressed data on the disc.

As set out above, to frustrate access of a device controlled to copy the disc to the content of the video object 50, embodiments of the invention propose not only that redundant control data, as illustrated in FIG. 6b, be added to the disc, but that that control data be provided with errors. For example, and as illustrated, the program chain 156 contains one program 158 and one pointer 160. However, the information on the disc about the program chain 156 is set to be inaccurate and to show, for example, that the program chain 156 includes two programs 158 and one pointer 160. Alternative inaccurate information about the program chain may be provided. For example it would be possible to show that the program chain 156 has one program 158 and two pointers 160.

Figure 7:
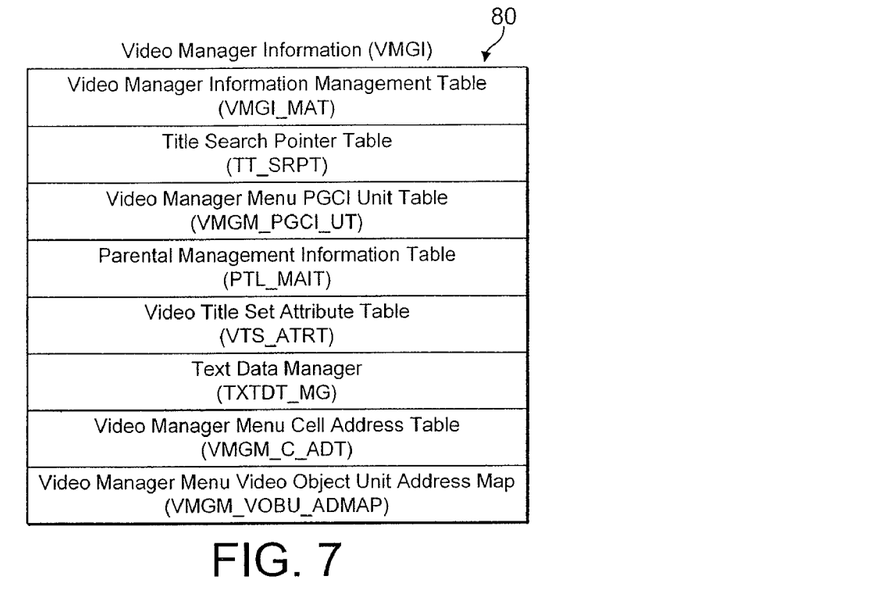
FIG. 7 shows the tables within a Video Manager Information Table.

FIG. 7 shows the Video Manager Information Table (VMGI) 80 which is generally found in the VMG information file 48 of a DVD. This table 80 will be familiar to anyone skilled in the art and is not further described herein.

Figure 8:
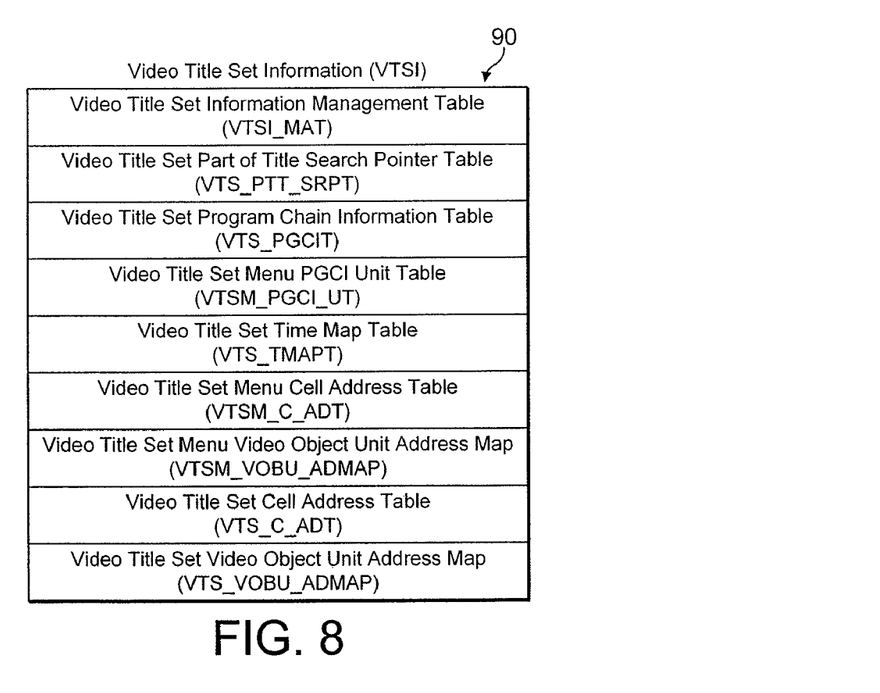
FIG. 8 shows the tables within a Video Title Set Information Table.

FIG. 8 shows the Video Title Set Information (VTSI) Table 90, which is also contained within a VTS information file 48.

In order to incorrectly show in the modified structure of FIG. 6b that the program chain 156 has two programs 158, the information in the PGC information table (VTS_PGCIT) of the VTSI table 90 is adjusted. There is generally also a backup table for VTSI (not illustrated), referred to as VTSI_BUP and any changes made to VTSI are, preferably, additionally made in the back up table.

The extra title 154 of the modified structure of FIG. 6b is identified by changing the title search pointer table (TT_SRPT) in the VMGI table 80.

It will be appreciated that it is important that, when playing a copy protected disc of the invention, a DVD player never tries to navigate to the added program 158. Accordingly, and as illustrated in FIG. 6b, a pre-command 162 may be provided in the program chain 156. This pre-command leads back to the original title 54 and ensures that if, during play of the DVD, a DVD player does access the added title 154, it will be navigated back to the operative program chain of the original title 154.

Figure 9:
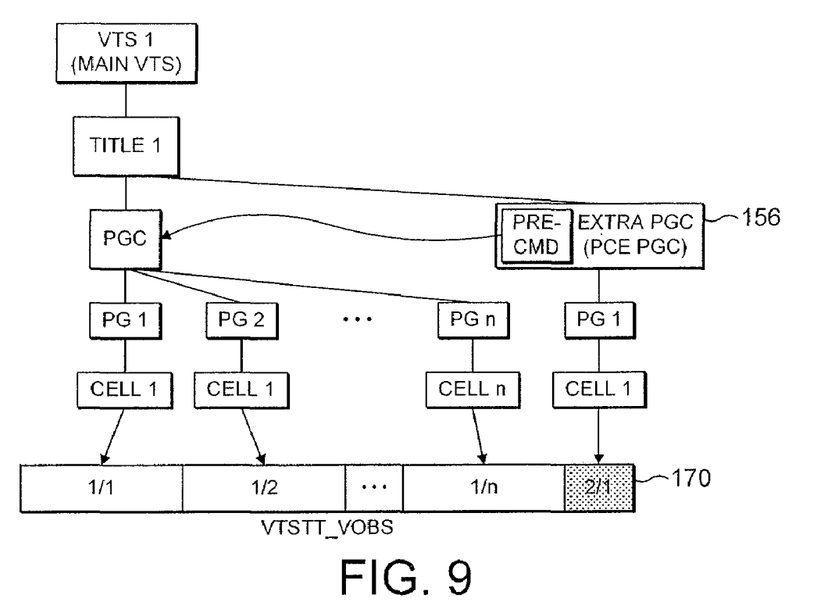
FIG. 9 shows a structure similar to that of FIG. 6b but where the added control data does not include a new title.
Figure 10:
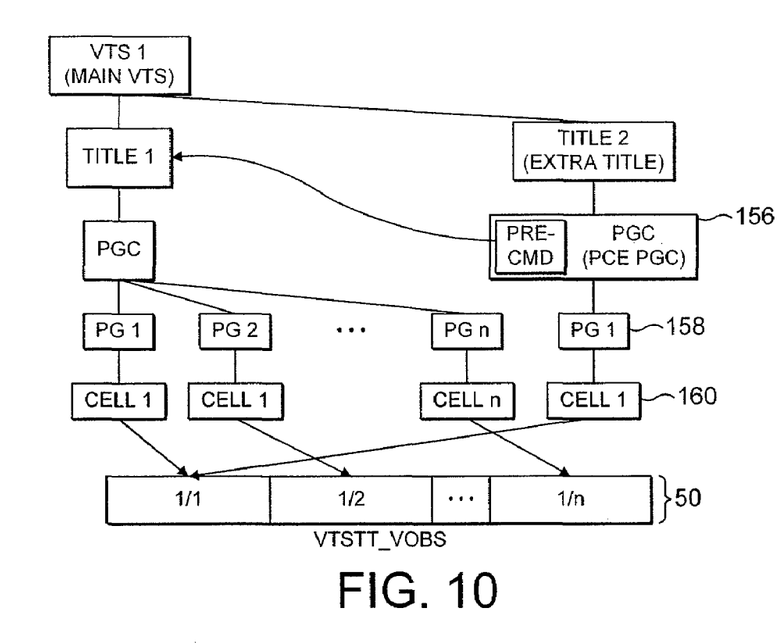
FIG. 10 shows a structure similar to that of FIG. 6b but with a pointer of an additional program chain addressing a cell already provided in the video object.

FIGS. 9 and 10 show alternative implementations of the invention. In FIG. 9, for example, no extra title as 154 is added and the added cell 170 is accessed by way of the added program chain 156. In this case, no change needs to be made to the VMGI table 80 to identify an extra title. The existence of the extra program chain 156 will be apparent from the table VTS_PGCIT in table VTSI 90. In addition, changes may need to be made to the Title Search Pointer Table (TT_SRPT) in table VMGI 80.

In the embodiment shown in FIG. 10, there has been no addition of an extra cell to the VTSTT_VOBS 50. In this arrangement, the program 158 is arranged to point by way of its pointer 160 to a cell 70 (1/1) already provided within the video object 50. However, on the disc, it is specified, incorrectly, that there are two programs 158 and a single pointer 160. As previously, alternative inaccurate information may be provided and, for example, it may be specified that there is a single program 158 and two pointers 160.

Figure 11:
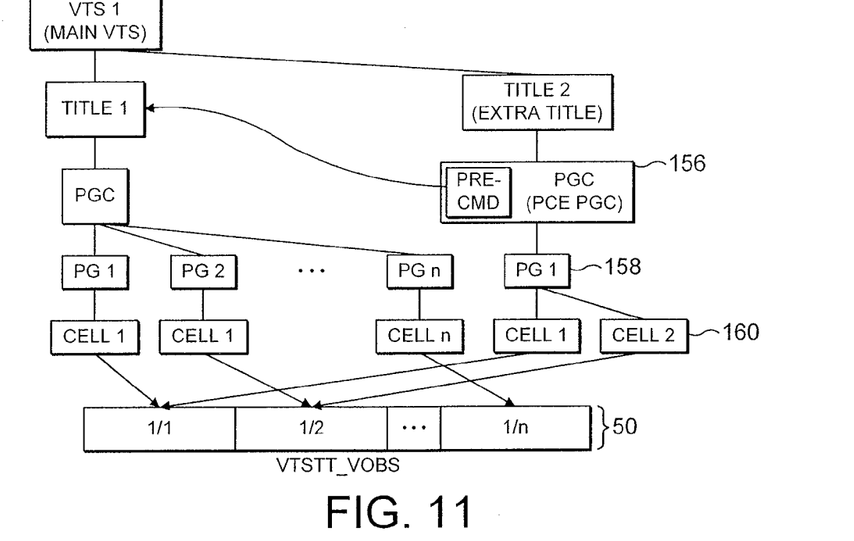
FIG. 11 shows a structure similar to that of FIG. 10 but having an additional program chain with two pointers.

FIG. 11 shows an arrangement in which the program 158 points, by way of two pointers 160, to two cells (1/1, 1/2) within the video object 50. Whilst this arrangement has one program and two pointers, the information can be set to show that there are two programs and two pointers.

In FIG. 11, the pointers 160 point to different cells 1/1 and 1/2 in the video object 50. It will be appreciated that both pointers might point, alternatively, to the same cell of the video object 50. It will also be appreciated that the extra title 154 may be provided with any number of program chains, any number of pointers, and may address any number of cells. In a preferred embodiment, the program chain 156 may have n−1 programs and n pointers but the information in the relevant tables will identify n programs and n pointers. Alternatively, there may be n programs and n−1 pointers and information in the relevant tables identifying n programs and n pointers. Further alternative inaccurate information may be specified.

Figure 12:
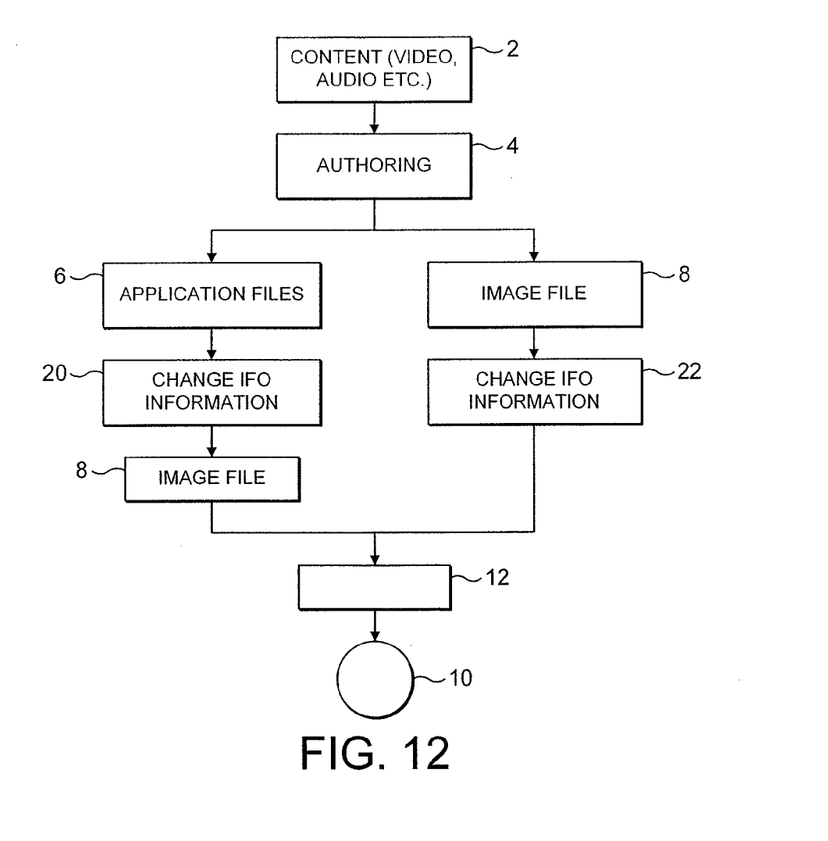
FIG. 12 is similar to FIG. 1 and illustrates schematically the production of a DVD with additional control data.

FIG. 12 is similar to FIG. 1 in that it shows the application of information to a glass master 10. However, FIG. 12 illustrates how the redundant control data, such as an additional program chain, can be added to the glass master 10. Where the authoring material 4 is arranged into application files 6, the extra program chain, for example, can be added in a new step 20 prior to the formation of the image file 8. Alternatively, the image file 8 may be subject to changes to include the extra program chain, for example, as indicated at 22 in FIG. 12.

The invention has been described above by reference specifically to the addition of extra program chains and to the alteration of data pertaining to those program chains. However, it will be appreciated that alternative changes may be made either in addition to, or instead of, those described. Of course, it is important to identify data which a device for copying a DVD will wish to access as a prelude to accessing and copying the data on the disc, but which identified data will not be utilised by a DVD player when playing the disc.

It may be that devices for copying DVDs will become even more sophisticated and will be able to discern, and deal with, some of the inconsistencies which will exist in modified structures as described above. One way of reducing the likelihood that a copying device will be able to identify and ignore inconsistent copy protection data would be to make the extra title substantially a copy of the original title with the same presentation time, the same number of programs, and the same number of pointers. This will make the extra title less visible to a copying device. In addition, further adjustments might be made to tables, such as the VMGI table 80 and the VTSI table 90, to hide the largest of the inconsistencies. Thus, for example, the TT_SRPT table in the VMGI table 80 might be adjusted so that the number of title parts it refers to equals those actually shown in the PGC content of the PGC General Information (PGC_GI) of the VTS_PGC Information Table.

As will be appreciated from the above, the method of copy protection as described protects a disc against a device controlled to copy the disc by parsing navigation data on the disc in order to access the data on the disc. The copying device will encounter and be confused by the inconsistencies provided in the redundant control data and this will prevent it from extracting the data from the disc. A DVD player, for example, of standard type, will not utilise the added redundant control data. Therefore, normal play of a DVD is unaffected by the copy protection technique.

In all of the embodiments described above, the redundant control data has been added to the data on the optical disc. Of course, if there is already control data on the disc which is redundant, in the sense that it is not utilised during play of the data on the disc, errors may be introduced into that redundant control data to provide copy protection.

Figure 13:
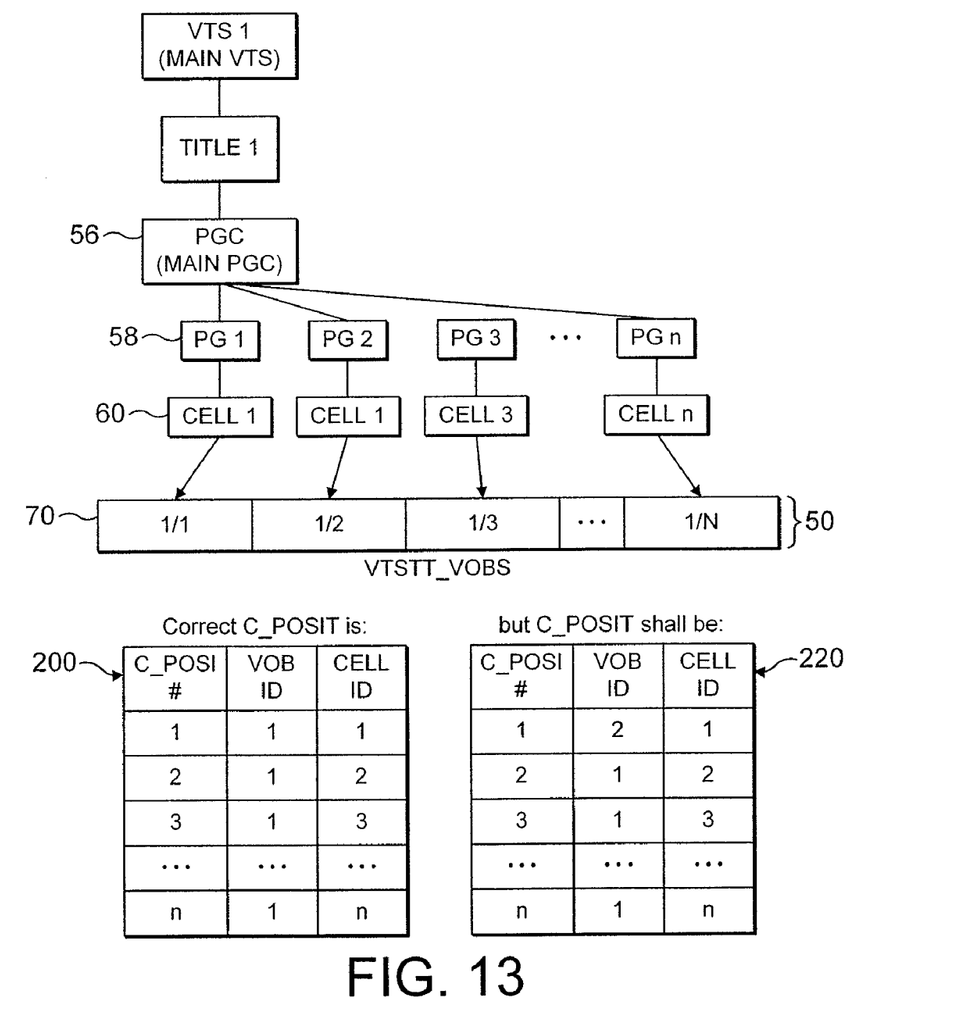
FIG. 13 shows part of the structure of an optical disc as, for example, in FIG. 6a, but shows the alteration of a C_POSIT table.

FIG. 13 illustrates an alternative method of copy protection in which errors are introduced into control data which is normally provided on the disc but which is not generally utilised by a DVD player. Such control data may, therefore, be also defined as 'redundant control data' as used in the previous embodiments.

In this respect, FIG. 13 shows part only of a data structure of a DVD, as in FIG. 4, and illustrates a number of programs 58 in a program chain 56 addressing individual cells 70 of a video object 50 by way of respective pointers 60.

The structure illustrated in FIG. 13 is described in the VTS information file 48 in tables such as the video title set menu cell address table (VTSM_C_ADT) and the video title set program chain information table (VTS_PGCIT). In particular, this latter table has a cell position table (C_POSIT) the contents of which for the structure of FIG. 13 are indicated at 200 in FIG. 13. It will be seen that the C_POSIT table gives an identification number for each pointer 60, identifies the video object (VOB 10), which each pointer addresses, and identifies the addressed cell in that video object.

It has been found that many DVD players use navigation data other than that in the C_POSIT table and thus that errors can be introduced into the table to subvert copying but without interfering with normal play of the optical disc. In this sense, therefore, a C_POSIT table can be considered to comprise redundant control data.

The type of inconsistency which can be incorporated to subvert copying is shown at 220 in FIG. 13. As illustrated, the video object identified by the pointer 1 is incorrectly said in table 220 to be in video object 2.

Figure 14A:
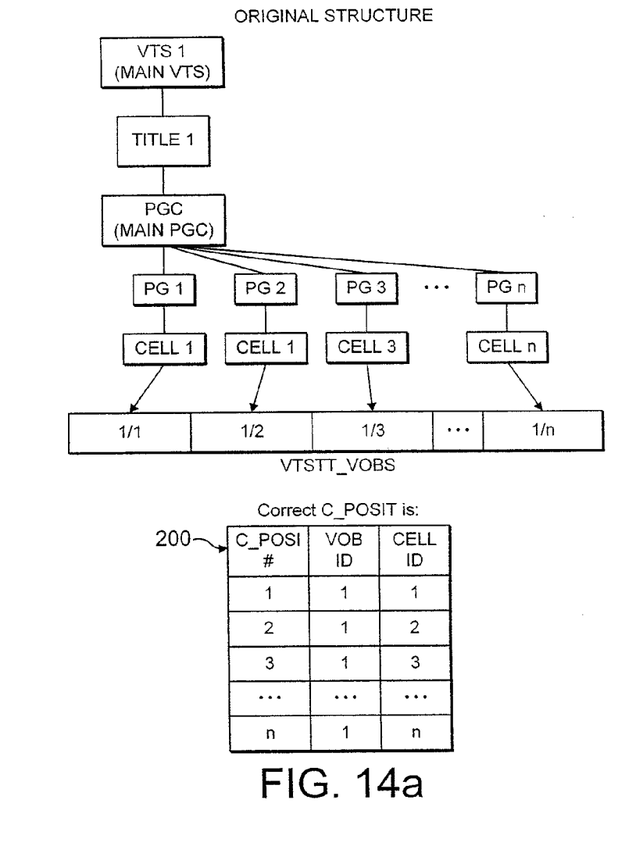
FIG. 14a shows a structure similar to that of FIG. 13 with its C_POSIT table.
Figure 14B:
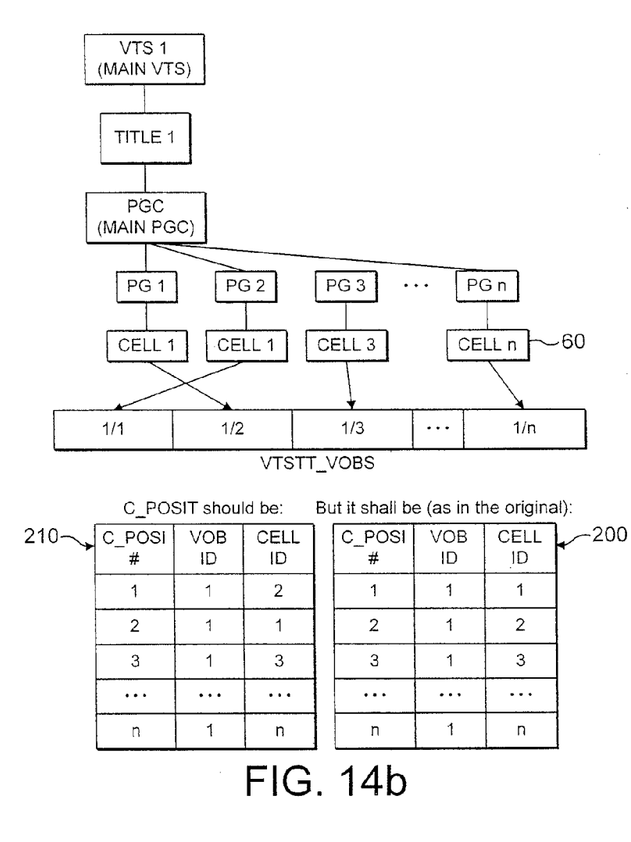
FIG. 14b shows the structure of FIG. 14a after alteration and illustrates the provision of an inaccurate C_POSIT table.

FIG. 14*a* shows a data structure which is identical to that of FIG. 13 together with its C_POSIT table 200. FIG. 14*b* shows an alternative to altering the values in the C_POSIT table. In FIG. 14*b*, the pointer 60 at position 2 has been altered such that it addresses cell 1/1, whilst the pointer at position 1 addresses cell 1/2. However, in this case the C_POSIT table has not been similarly altered to reflect those changes but remains the same as table 200. Table 210 is the accurate, but not used, version of the table for the structure of FIG. 14*b*, whilst original table 200 is used and thus provides the necessary inconsistency between the C_POSIT table 200 and the structure of FIG. 14*b*.

Figure 15A:
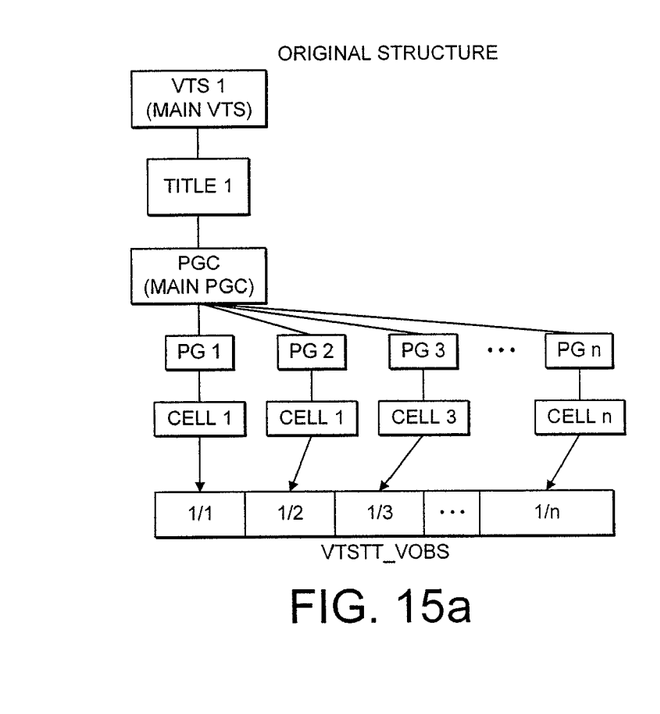
FIG. 15a shows a structure of a disc as, for example, in FIG. 6a, and FIG. 15b shows the alteration of the structure of FIG. 15a for an alternative implementation of the technique shown in FIG. 14b.
Figure 15B:
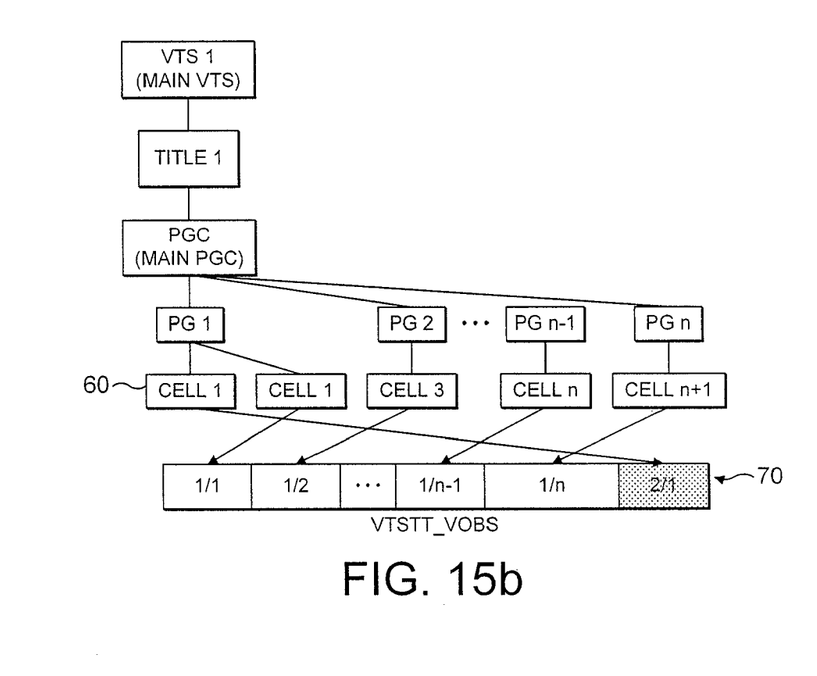

FIG. 15*a* also shows the structure which is illustrated in FIGS. 13 and 14*a*. In FIG. 15*b* a change in the structure to provide copy protection is illustrated. In FIG. 15*b* an additional cell 70 at position 2/1 has been provided. This is a blank cell which is addressed by the pointer 60 at position 1 such that it is presented first. Again, the alteration of the structure from FIG. 15*a* to FIG. 15*b* is not reflected in the C_POSIT tables which will be provided. During normal play of the disc, the pointer 60 at position 1 will access the blank cell 2/1. However, if this simply contains a few frames of blank video with no audio it will be played before the playback of the rest of the presentational data and will not be noticeable.

It will be appreciated that modifications to, and variations in, the techniques as described and illustrated herein may be made within the scope of this application.

The invention claimed is:

1. A method of copy protecting an optical disc having a capacity greater than that of a standard compact disc and carrying content and control data, wherein the content is arranged in one or more content files and the control data is arranged to control access to the content files, the method comprising:
providing a control data structure utilised during play of the content on the disc and including a title and a program chain;
providing a redundant control data structure which cannot be utilised during play of the content on the disc and having no pointers thereto in the control data structure wherein the redundant control data structure includes at least one of a title or a program chain;
incorporating errors into the redundant control data structure,
wherein the errors are arranged to frustrate access to the content files by way of the control data for copying the content files and are not accessed during normal play of the copy protected optical disc by a player of standard type and are accessed by a device copying the copy protected optical disc.

2. A method as claimed in claim 1, wherein the redundant control data structure defines program paths providing access to the content files, and wherein the errors are arranged to frustrate navigation of at least one program path.

3. A method as claimed in claim 1, wherein the content files are video object files and are composed of video objects (VOBs) which are divided into cells, and wherein the cells can be accessed by respective pointers in a program chain.

4. A method as claimed in claim 3, wherein the errors incorporated in the redundant control data structure incorrectly identify the number of programs in the program chain defined by the control data.

5. A method as claimed in claim 3, wherein the errors incorporated in the redundant control data structure incorrectly identify the number of pointers in the program chain defined by the control data.

6. A method as claimed in claim 3, wherein the errors are inconsistencies in a Video Manager Information Table (VMGI).

7. A method as claimed in claim 3, wherein the errors are inconsistencies in a Video Title Set Information Table (VTSI).

8. A method as claimed in claim 7, wherein the errors are inconsistencies in a cell position information table in the Video Title Set Information Table (VTSI).

9. A method as claimed in claim 7, further comprising altering the addressing of cells in the video objects (VOBs) such that the addressing of the cells and the information in a cell position information table are the inconsistencies.

10. A method as claimed in claim 1, further comprising identifying the redundant control data structure by a pre-command further preventing utilisation of the-control data structure during play.

11. A method as claimed in claim 1, further comprising incorporating the errors into the redundant control data structure before application thereof to the optical disc.

12. A method as claimed in claim 1, further comprising providing at least one region within the content files containing unreadable or other subversive data.

13. A method as claimed in claim 12, further comprising including data patterns, which have been chosen to cause DSV problems, as the unreadable data.

14. A copy protected optical disc having a capacity greater than that of a standard compact disc and carrying content and control data, wherein the content is arranged in one or more content files and the control data is arranged to control access to the content files, the control data comprising (1) a control data structure including a title and program chain utilised during play of the content on the disc and (2) a redundant control data structure, which cannot be utilised during play of the content on the disc and having no pointers thereto in the control data structure, and which includes at least one of a title or a program chain and has errors incorporated therein, the errors having been arranged to frustrate access to the content files by way of the control data for copying the content files and are not accessed during normal play of the copy protected optical disc by a player of standard type and are accessed by a device copying the copy protected optical disc.

15. A copy protected optical disc as claimed in claim 14, wherein the redundant control data structure defines program paths providing access to the content files, and wherein the errors are arranged to frustrate navigation of at least one program path.

16. A copy protected optical disc as claimed in claim 14, wherein the content files are video object files composed of video objects (VOBs) which are divided into cells, and wherein the cells can be accessed by respective pointers in a program chain.

17. A copy protected optical disc as claimed in claim 16, wherein the errors incorporated in the redundant control data structure incorrectly identify the number of programs in the program chain defined by the control data.

18. A copy protected optical disc as claimed in claim 16, wherein the errors incorporated in the redundant control data structure incorrectly identify the number of pointers in the program chain defined by the control data.

19. A copy protected optical disc as claimed in claim 16, wherein the errors incorporated in the redundant control data structure are inconsistencies in a Video Manager Information Table (VMGI).

20. A copy protected optical disc as claimed in claim 16, wherein the errors incorporated in the redundant control data structure are inconsistencies in a Video Title Set Information Table (VTSI).

21. A copy protected optical disc as claimed in claim 20, wherein the inconsistencies in the Video Title Set Information Table (VTSI) are in a cell position information table.

22. A copy protected optical disc as claimed in claim 20, wherein the addressing of cells in the video object (VOB) file is inconsistent with the information in a cell position information table.

23. A copy protected optical disc as claimed in claim 14, wherein at least one region of the disc is provided within the content files which contains unreadable or other subversive data.

24. A copy protected optical disc as claimed in claim 23, wherein the unreadable or subversive data includes data patterns chosen to cause DSV problems.

25. A non-transitory recordable media storing an image file for use in the mastering of a copy protected optical disc having a capacity greater than that of a standard compact disc, the image file including content and control data, the content being arranged in one or more content files, and the control data being arranged to control access to the content files, the control data comprising (1) a control data structure which will be utilised by play of the mastered disc and which include a title and a program chain and (2) a redundant control data structure, which cannot be utilised by play of the mastered disc and having no pointers thereto in the control data structure and which includes at least one of a title or a program chain, and has errors incorporated therein, the errors being arranged to frustrate access to the content files by way of the control data on the mastered disc for copying the content files and are not accessed during normal play of the copy protected optical disc by a player of standard type and are accessed by a device copying the copy protected optical disc.

26. A recordable media as claimed in claim 25, wherein the redundant control data structure defines program paths providing access to the content files, and wherein the errors are arranged to frustrate navigation of at least one program path.

27. A recordable media as claimed in claim 25, wherein the content files are video object files composed of video objects (VOBs) which are divided into cells, and wherein the cells can be accessed by respective pointers in a program chain.

28. A recordable media as claimed in claim 27, wherein the errors incorporated in the redundant control data structure incorrectly identify the number of programs in the program chain defined by the control data.

29. A recordable media as claimed in claim 27, wherein the errors incorporated in the redundant control data structure incorrectly identify the number of pointers in the program chain defined by the control data.

30. A recordable media as claimed in claim 27, wherein the errors incorporated in the redundant control data structure are inconsistencies in a Video Manager Information Table (VMGI).

31. A recordable media as claimed in claim 27, wherein the errors incorporated in the redundant control data structure are inconsistencies in a Video Title Set Information Table (VTSI).

32. A recordable media as claimed in claim 31, wherein the inconsistencies are in a cell position information table in the Video Title Set Information Table (VTSI).

33. A recordable media as claimed in claim 31, wherein the addressing of cells in the video object (VOB) file is inconsistent with the information in a cell position information table.

34. A recordable media as claimed in claim 25, wherein at least one region is provided within the content files which contains unreadable or other subversive data.

35. A recordable media as claimed in claim 34, wherein the unreadable or subversive data includes data patterns chosen to cause DSV problems.

36. A method of forming an image file for use in producing a copy protected optical disc having a capacity greater than that of a standard compact disc, the method comprising:

forming an image file including content and control data, the content being arranged in one or more content files, and the control data being arranged to control access to the content files and including (1) a control data structure which will be utilised by play of the produced disc and which includes a title and a program chain and (2) a redundant control data structure which cannot be utilised by play of the produced disc and having no pointers thereto in the control data structure and wherein the redundant control data structure includes at least one of a title or a program chain;

and the method further comprising:

incorporating errors into the redundant control data structure, the errors being arranged to frustrate access to the content files by way of the control data on the produced disc for copying the content files and are not accessed during normal play of the copy protected optical disc by a player of standard type and are accessed by a device copying the copy protected optical disc; and storing the image file.

37. A method as claimed in claim 36, further comprising storing the image file on a recordable disc or on magnetic tape.

38. A method as claimed in claim 36, wherein the control data defines program paths providing access to the content files, and wherein the incorporated errors are arranged to prevent navigation of the program paths.

39. A method as claimed in claim 36, wherein the content files can be accessed by respective pointers in the program chain.

40. A method as claimed in claim 1, wherein the errors include inaccurate information about programs or pointers in the program chain.

41. A copy protected optical disc as claimed in claim 14, wherein the errors include inaccurate information about programs or pointers in the program chain.

42. A recordable media as claimed in claim 25, wherein the errors include inaccurate information about programs or pointers in the program chain.

43. A method as claimed in claim 36, wherein the errors include inaccurate information about programs or pointers in the program chain.

44. A copy protected optical disc as claimed in claim 14, wherein the redundant control data structure is identified by a pre-command further preventing utilisation of the redundant control data structure during play.

45. A recordable medium as claimed in claim 25, wherein the redundant control data structure is identified by a pre-command further preventing utilisation of the redundant control data structure during play of the mastered disc.

46. A method as claimed in claim 1, wherein the redundant control data structure is accessible only by a device which copies the copy protected optical disc by parsing navigational control data or by copying sector by sector or file by file.

* * * * *